(12) United States Patent
Baek et al.

(10) Patent No.: US 12,540,653 B2
(45) Date of Patent: Feb. 3, 2026

(54) SHOCK ABSORBER

(71) Applicant: HL MANDO CORPORATION, Pyeongtaek (KR)

(72) Inventors: Kwangduk Baek, Yongin (KR); Seungjoon Lee, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 444 days.

(21) Appl. No.: 18/051,877

(22) Filed: Nov. 2, 2022

(65) Prior Publication Data

US 2023/0135744 A1 May 4, 2023

(30) Foreign Application Priority Data

Nov. 3, 2021 (KR) .......................... 10-2021-0149852

(51) Int. Cl.
*F16F 9/48* (2006.01)
*F16F 9/18* (2006.01)
(Continued)

(52) U.S. Cl.
CPC .................. *F16F 9/48* (2013.01); *F16F 9/18* (2013.01); *F16F 9/3488* (2013.01); *F16F 9/585* (2013.01)

(58) Field of Classification Search
CPC .. F16F 9/48; F16F 9/585; F16F 9/3488; F16F 9/18
See application file for complete search history.

(56) References Cited

U.S. PATENT DOCUMENTS 2,729,308 A 1/1956 Koski
6,814,193 B2 * 11/2004 Grundei .................. F16F 9/061
188/322.22
(Continued)

FOREIGN PATENT DOCUMENTS

AU 2017101642 A 1/2018
CN 201396391 Y * 2/2010
(Continued)

OTHER PUBLICATIONS

KR OA dated Mar. 20, 2023.
DE Office Action of the corresponding family application.

*Primary Examiner* — Vishal R Sahni
(74) *Attorney, Agent, or Firm* — Harvest IP Law, LLP (57) ABSTRACT

Disclosed herein is a shock absorber according to the present disclosure. According to an aspect of the present disclosure, provided is a shock absorber including a cylinder filled with a fluid and a piston valve coupled to an end of a piston rod and configured to partition an inside of the cylinder into a tension chamber and a compression chamber, the shock absorber including a support member coupled to an end of the cylinder and provided with a connection flow path, a first guide member forming a first pressing chamber and provided with a first flow path formed to vertically pass therethrough, a second guide member forming a second pressing chamber and having a second flow path configured to allow the second pressing chamber to communicate with the compression chamber, an opening/closing member provided at an end of the piston valve and provided to press the second guide member upon lowering the piston rod, a first elastic member provided between the first guide member and the support member, and a second elastic member provided between the first guide member and the second guide member.

13 Claims, 12 Drawing Sheets

(51) Int. Cl.
*F16F 9/348* (2006.01)
*F16F 9/58* (2006.01)

(56) References Cited

U.S. PATENT DOCUMENTS

| | | | | |
|---|---|---|---|---|
| 8,978,845 | B2 * | 3/2015 | Kim | ...................... F16F 9/5126 |
| | | | | 188/313 |
| 9,091,320 | B1 * | 7/2015 | Smith | ........................ F16F 9/48 |
| 9,533,542 | B2 * | 1/2017 | Allen | ..................... B60G 17/08 |
| 9,546,707 | B2 | 1/2017 | Kus | |
| 9,695,899 | B2 * | 7/2017 | Smith | ........................ F16F 9/22 |
| 2009/0078518 | A1 * | 3/2009 | Gagnon | ..................... F16F 9/48 |
| | | | | 188/315 |
| 2016/0333959 | A1 * | 11/2016 | Kim | ...................... F16F 9/3482 |
| 2020/0011395 | A1 * | 1/2020 | Sankaran | ................... F16F 9/49 |
| 2022/0381314 | A1 * | 12/2022 | Lee | ........................... F16F 9/18 |

FOREIGN PATENT DOCUMENTS

| | | | | | |
|---|---|---|---|---|---|
| CN | 202220821 | U | * | 5/2012 | |
| CN | 207178557 | U | * | 4/2018 | ................ F16F 9/06 |
| CN | 108006145 | A | * | 5/2018 | .............. F16F 9/185 |
| CN | 208845625 | U | * | 5/2019 | |
| DE | 102014211129 | A1 | * | 12/2015 | .............. F16F 9/067 |
| DE | 102022205133 | A | | 12/2022 | |
| GB | 1366972 | A | * | 9/1974 | ............. B60R 19/32 |
| JP | 2020067173 | A | | 4/2020 | |
| KR | 1020180083725 | A | | 7/2018 | |
| KR | 20210081085 | A | | 7/2021 | |

\* cited by examiner

SHOCK ABSORBER

CROSS-REFERENCE TO RELATED APPLICATION

This application claims the benefit of Korean Patent Application No. 10-2021-0149852, filed on Nov. 3, 2021 in the Korean Intellectual Property Office, the disclosure of which is incorporated herein by reference.

BACKGROUND

1. Field

Embodiments of the present disclosure relate to a shock absorber, and more particularly, to a shock absorber capable of realizing a step-by-step damping force according to the amount of shock transmitted from a road surface during a compression stroke, and buffering the shock during the compression stroke at an extremely low speed so as to improve ride comfort and adjustment stability.

2. Description of the Related Art

In general, buffers that improve riding comfort by buffering shocks or vibrations that axles receive from road surfaces during driving are installed in vehicles, and shock absorbers are used as one of the buffers.

The shock absorbers are operated according to the vibrations of the vehicles according to conditions of the road surfaces, and in this case, damping forces generated by the shock absorbers vary according to the operating speed of the shock absorber, that is, whether the operating speed is fast or slow.

Since the ride comfort and driving stability of the vehicles can be controlled depending on how characteristics of the damping forces generated by the shock absorbers are adjusted, it is important to adjust the characteristics of the damping forces of the shock absorbers when vehicles are designed.

Such a shock absorber is typically provided with a cylinder filled with a working fluid (oil), a piston rod that is connected to a vehicle body side and reciprocates, and a piston valve that is coupled to a lower end of the piston rod, slides in the cylinder, and controls the flow of the working fluid.

The piston valve is designed to have a constant damping characteristic at a high speed, a medium speed, and a low speed using a single flow path. However, such a piston valve has a structure in which it is difficult for a damping force to act when the compression stroke is performed at an extremely low speed.

Further, there is a need to secure a length of the cylinder over a predetermined length so that the piston rod performs the compression stroke over a predetermined stroke, and this causes excessive increases in the length and volume of the shock absorber.

RELATED ART DOCUMENT

Patent Document

Korean Patent Application Publication No. 10-2018-0083725 (Jul. 23, 2018)

SUMMARY

Therefore, it is an aspect of the present disclosure to provide a shock absorber configured to prevent an excessive increase in the length and volume of a device by providing an additional damping force over a certain stroke during a compression stroke.

It is another aspect of the present disclosure to provide a shock absorber capable of improving ride comfort and adjustment stability of a vehicle by providing a step-by-step damping force over a certain stroke during the compression stroke.

Additional aspects of the disclosure will be set forth in part in the description which follows and, in part, will be obvious from the description, or may be learned by practice of the disclosure.

In accordance with one aspect of the present disclosure, a shock absorber including a cylinder filled with a fluid and a piston valve coupled to a piston rod and configured to partition an inside of the cylinder into a tension chamber and a compression chamber, includes a support member coupled to an end of the cylinder and provided with a connection flow path, a first guide member forming a first pressing chamber and provided with a first flow path formed to vertically pass therethrough, a second guide member forming a second pressing chamber and having a second flow path configured to allow the second pressing chamber to communicate with the compression chamber, an opening/closing member coupled to an end of the piston rod and provided to press the second guide member upon lowering the piston rod, a first elastic member provided between the first guide member and the support member, and a second elastic member provided between the first guide member and the second guide member.

The first pressing chamber may be formed between the support member and the first guide member which are disposed to be spaced apart from each other.

The second pressing chamber may be formed between the first guide member and the second guide member which are disposed to be spaced apart from each other.

An outer circumferential surface of the first guide member may be in close contact with an inner circumferential surface of the cylinder, and the first flow path may be provided at a central portion of the first guide member.

The first flow path may include a first main flow path formed to pass through the central portion of the first guide member in an axial direction and a first slit flow path formed to be recessed in a bottom surface of the first guide member in a direction perpendicular to the axial direction.

An outer circumferential surface of the second guide member may be in close contact with an inner circumferential surface of the cylinder, and the second flow path may be provided at a central portion of the second guide member.

The second flow path may include a second main flow path formed to pass through the central portion of the second guide member in an axial direction and a second slit flow path formed to be recessed in a top surface of the second guide member in a direction perpendicular to the axial direction.

The opening/closing member may include a body, a flange formed to extend radially outward from a bottom surface of the body, and a hole which is provided in the body and into which the end of the piston rod is inserted.

An outer diameter of the flange may be provided greater than an inner diameter of the second main flow path and smaller than an inner diameter of the second slit flow path.

One side of the first elastic member may be inserted into a first groove provided in a bottom surface of the first guide member, and the other side thereof may be inserted into a second groove provided in a top surface of the support member.

One side of the second elastic member may be coupled to a first protrusion provided on a top surface of the first guide member, and the other side thereof may be coupled to a second protrusion provided on a bottom surface of the second guide member.

The shock absorber may further include an outer tube disposed to be spaced apart from an outside of the cylinder and having a reservoir chamber formed between the cylinder and the outer tube.

The shock absorber may further include a body valve coupled to a lower end of the support member, configured to allow the connection flow path to communicate with the reservoir chamber, and configured to generate a damping force.

An elastic modulus of the first elastic member may be provided greater than an elastic modulus of the second elastic member.

An elastic modulus of the first elastic member may be provided smaller than an elastic modulus of the second elastic member.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are presented to sufficiently convey the spirit of the present disclosure to those skilled in the art to which the present disclosure pertains. The present disclosure is not limited to the embodiments presented herein and may be embodied in other forms. In the drawings, illustration of components irrelevant to the description will be omitted to clarify the present disclosure, and the sizes of the components may be slightly exaggerated to help understanding.

Figure 1:
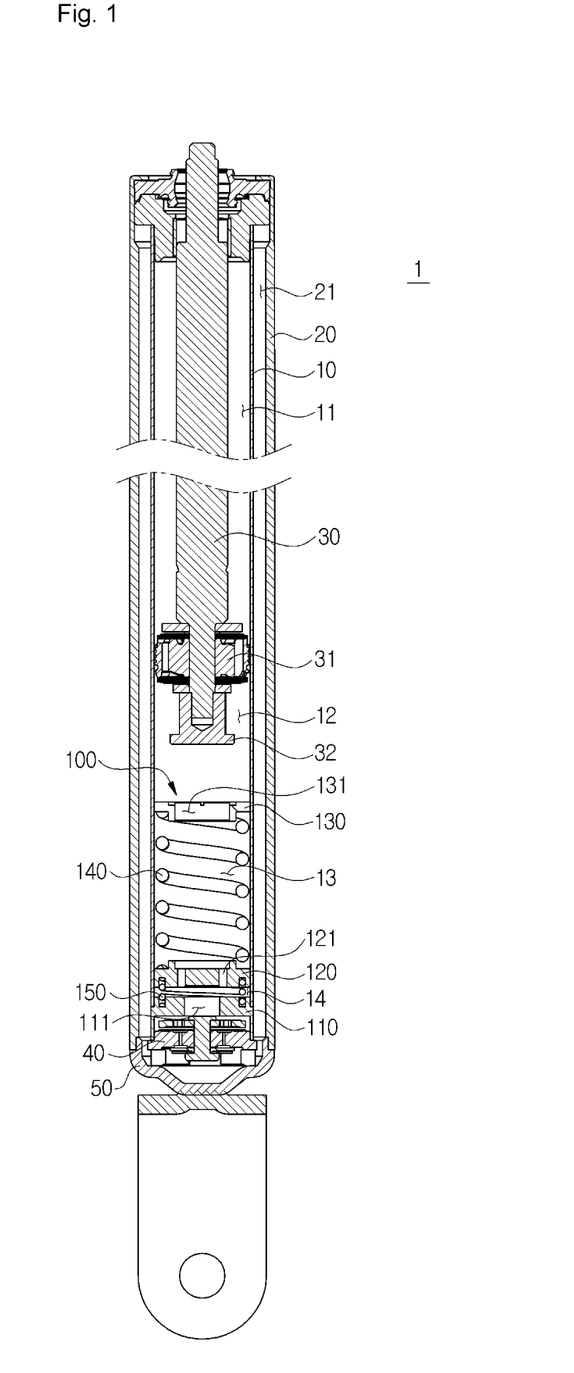
FIG. 1 is a cross-sectional view illustrating a shock absorber according to an embodiment of the present disclosure.
Figure 2:
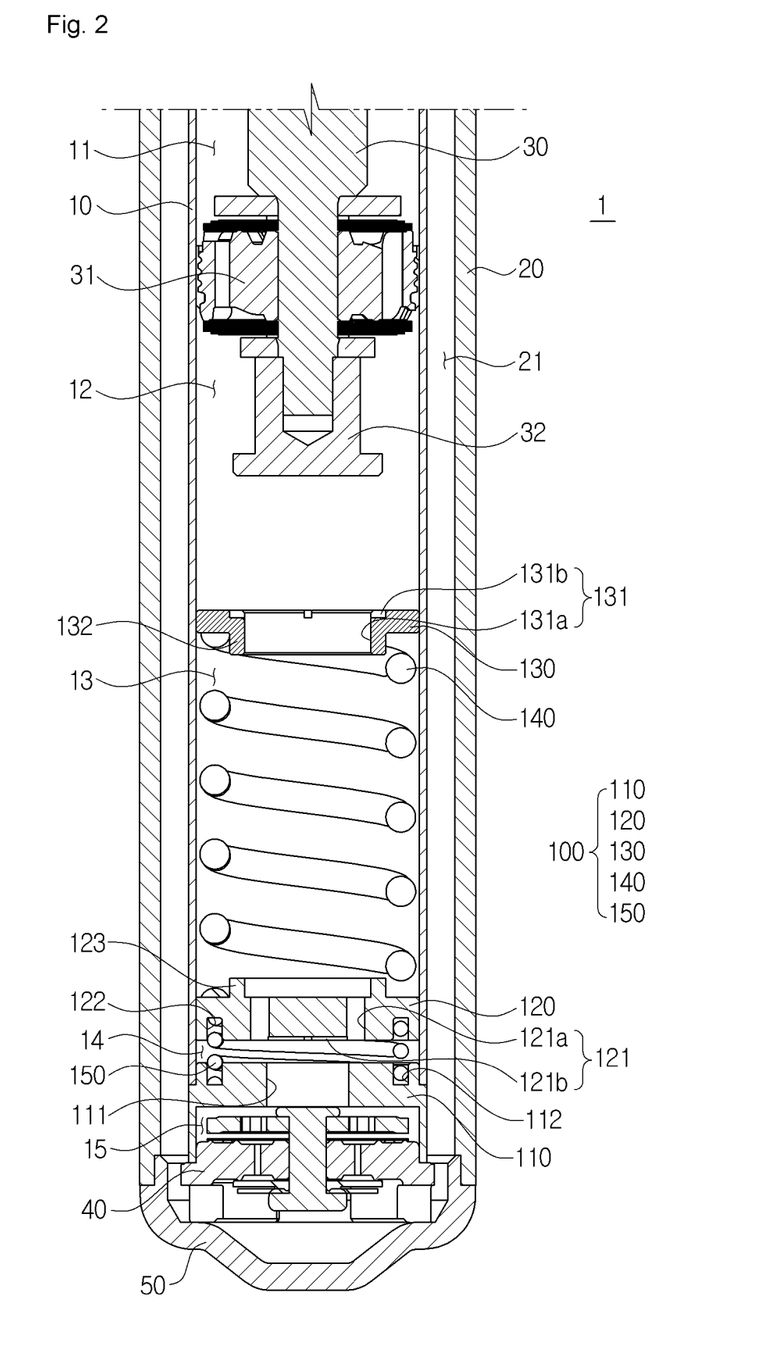
FIG. 2 is an enlarged cross-sectional view illustrating the shock absorber according to the embodiment of the present disclosure.
Figure 3:
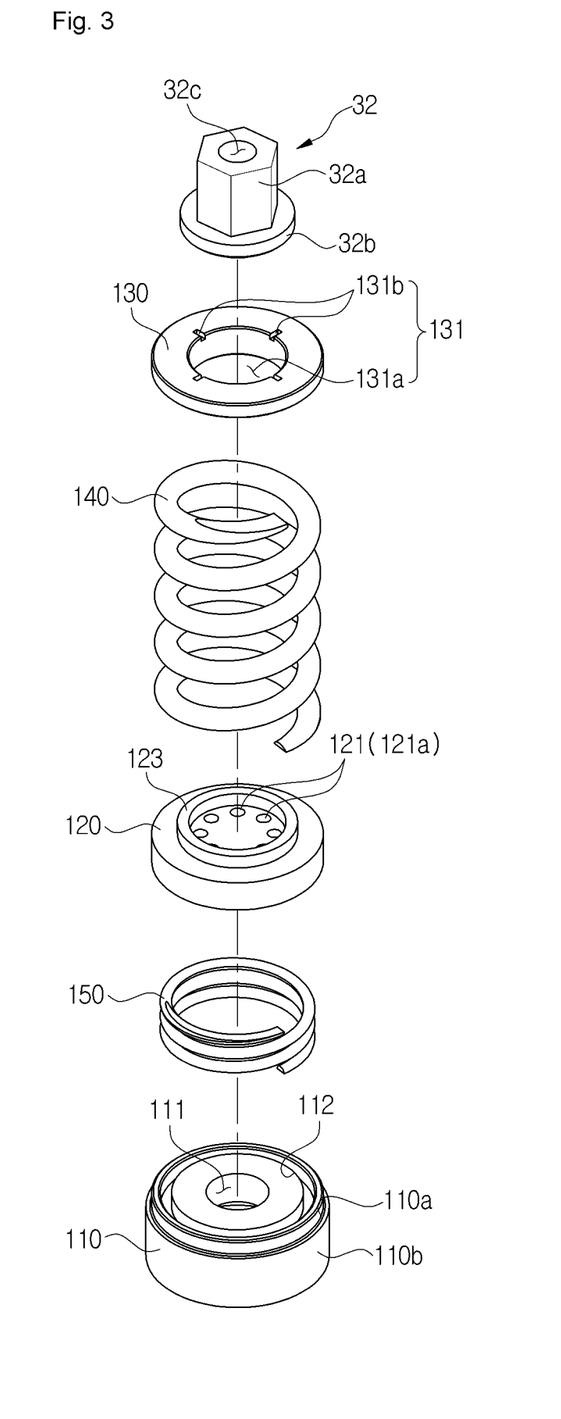
FIG. 3 is an exploded perspective view illustrating a part of the shock absorber according to the embodiment of the present disclosure.
Figure 4:
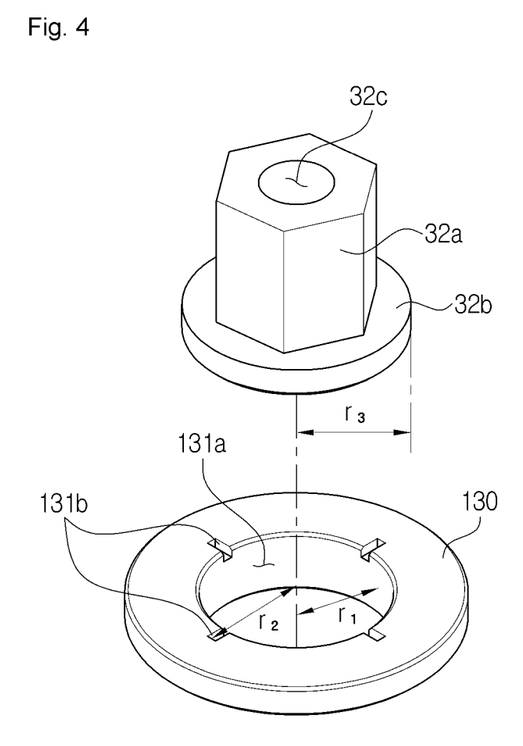
FIG. 4 is a perspective view illustrating an opening/closing member and a second guide member of the shock absorber according to the embodiment of the present disclosure.
Figure 5:
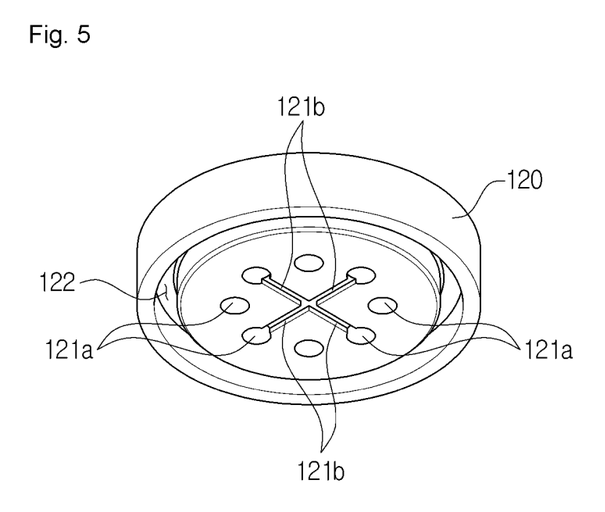
FIG. 5 is a perspective view illustrating a bottom surface of a first guide member of the shock absorber according to the embodiment of the present disclosure.

FIG. 1 is a cross-sectional view illustrating a shock absorber according to an embodiment of the present disclosure, FIG. 2 is an enlarged cross-sectional view illustrating the shock absorber according to the embodiment of the present disclosure, FIG. 3 is an exploded perspective view illustrating a part of the shock absorber according to the embodiment of the present disclosure, FIG. 4 is a perspective view illustrating an opening/closing member and a second guide member of the shock absorber according to the embodiment of the present disclosure, and FIG. 5 is a perspective view illustrating a bottom surface of a first guide member of the shock absorber according to the embodiment of the present disclosure.

Referring to FIGS. 1 to 5, a shock absorber 1 according to the embodiment of the present disclosure may include a piston rod 30 that reciprocates inside a cylinder 10 filled with a fluid, a piston valve 31 mounted on the piston rod 30 and configured to partition an inside of the cylinder 10 into a tension chamber 11 and a compression chamber 12, and a valve assembly 100 coupled to an end of the cylinder 10 and configured to change a damping force according to displacement of the piston rod 30. Further, the shock absorber 1 according to the embodiment of the present disclosure may further include an outer tube 20 which is provided outside the cylinder 10 and in which a reservoir chamber 21 is formed and a body valve 40 coupled to a lower end of the valve assembly 100, allowing the reservoir chamber 21 to communicate with the valve assembly 100, and configured to generate the damping force.

The cylinder 10 may be provided in a cylindrical shape having a space formed therein, and a working fluid (oil) fills the cylinder 10. Further, the inside of the cylinder 10 may be partitioned into the lower compression chamber 12 and the upper tension chamber 11 by the piston valve 31.

One end of the piston rod 30 is located inside the cylinder 10, and the other end thereof extends outward from the cylinder 10 and is connected to a vehicle body (not illustrated) or wheel side of a vehicle. In this case, the piston valve 31 and an opening/closing member 32 are mounted on the one end of the piston rod 30.

The piston valve 31 together with the piston rod 30 is provided to reciprocate inside the cylinder 10 filled with the fluid in a state of being coupled through the piston rod 30.

In this case, at least one compression flow path and at least one tension flow path are formed to vertically pass through the piston valve 31 so that the fluid may move during a compression stroke or a tension stroke. The piston valve 31 generates a damping force due to the resistance of the fluid while flowing the fluid into the compression chamber 12 or the tension chamber 11 during the compression stroke or the tension stroke within the cylinder 10.

The valve assembly 100 may be coupled to an end of the cylinder 10 and provided to change the damping force according to displacement of the piston rod 30. In detail, the valve assembly 100 may generate an additional damping force according to a stroke length of the piston rod 30 during the compression stroke of the piston valve 31. A detailed description of the valve assembly 100 will be made below.

The body valve 40 may be coupled to a lower end of the valve assembly 100 and generate an additional damping force. In detail, the body valve 40 may include a body interposed between the valve assembly 100 and a valve case 50 and having at least one flow path that is vertically passes therethrough, a plurality of disks provided at upper and lower ends of the body and configured to adjust the flow of the fluid passing through the flow path so as to generate a damping force, and a fastening member configured to fasten the plurality of disks to the body.

The outer tube 20 may be provided in a cylindrical shape having a space formed therein, the inner diameter of the outer tube 20 is provided greater than the cylinder 10, and the cylinder 10 is accommodated inside the outer tube 20. In this case, the reservoir chamber 21 filled with the working fluid (the oil) is formed between the inside of the outer tube 20 and the outside of the cylinder 10. The reservoir chamber 21 is provided to communicate with the cylinder 10 through the body valve 40 and the valve assembly 100.

Hereinafter, the valve assembly 100 of the shock absorber 1 according to the embodiment of the present disclosure will be described in detail.

The valve assembly 100 according to the embodiment of the present disclosure may include a support member 110 coupled to the end of the cylinder 10 and provided with a connection flow path 111, a first guide member 120 which forms a first pressing chamber 14 between the support member 110 and the first guide member 120 and through which a first flow path 121 is formed to pass, a second guide member 130 which forms a second pressing chamber 13 between the first guide member 120 and the second guide member 130 and has a second flow path 131 formed to allow the second pressing chamber 13 to communicate with the compression chamber 12, the opening/closing member 32 coupled to the end of the piston rod 30 and provided to press the second guide member 130 when the piston rod 30 is lowered, a first elastic member 150 provided between the first guide member 120 and the support member 110, and a second elastic member 140 provided between the first guide member 120 and the second guide member 130.

The valve assembly 100 may additionally add a damping force according to the stroke length of the piston rod 30 during the compression stroke. A detailed description of an operation of the valve assembly 100 will be given below in the following description of the operation.

The support member 110 may be provided such that one side thereof is coupled to the end of the cylinder 10 to support a lower end of the first elastic member 150 and the body valve 40 is coupled to the other side thereof.

In detail, the support member 110 may include a small-diameter portion 110a press-fitted to the end of the cylinder 10 and a large-diameter portion 110b which has a larger radius than the small-diameter portion 110a and has a hollow connection chamber 15 formed at a lower end thereof and to which the body valve 40 is coupled.

The support member 110 may be provided with the connection flow path 111 that is vertically formed through a central portion thereof and is provided to allow the fluid to flow therethrough. Accordingly, the connection flow path 111 allows the first pressing chamber 14 to communicate with the connection chamber 15.

The support member 110 may be provided with a groove 112 formed in an upper surface thereof and configured to accommodate and support the lower end of the first elastic member 150. For example, the groove 112 may be provided to be recessed in a circumferential direction in the upper surface of the support member 110.

The first guide member 120 is disposed between and spaced apart from the support member 110 and the second guide member 130, forms the first pressing chamber 14 between the support member 110 and the first guide member 120, and forms the second pressing chamber 13 between the first guide member 120 and the second guide member 130.

The first guide member 120 is provided with the first flow path 121 allowing the first pressing chamber 14 to communicate with the second pressing chamber 13.

In detail, the first flow path 121 may include a first main flow path 121a provided in the form of a plurality of cylindrical holes radially arranged and formed to vertically pass through the first guide member 120, and a first slit flow path 121b recessed in a bottom surface of the first guide member 120 to communicate with the first main flow path 121a and extending in the form of a slit toward a central portion of the first guide member 120. In this case, the first slit flow path 121b may be provided in the form in which at least portions of the first main flow path 121a is connected to each other.

Accordingly, the first guide member 120 allows the first pressing chamber 14 to communicate with the second pressing chamber 13 and enables the fluid to flow through the first slit flow path 121b even when in close contact with the support member, and thus it is possible to prevent a negative pressure from being generated in the first pressing chamber 14.

A lower end of the first guide member 120 is elastically supported by the first elastic member 150, and an upper end thereof is elastically supported by the second elastic member 140.

The elastic modulus of the first elastic member 150 may be provided smaller than the elastic modulus of the second elastic member 140. Accordingly, when the opening/closing member 32 coupled to the end of the piston rod 30 presses the second guide member 130 during the compression stroke, the second guide member 130 may press the first guide member 120 through the second elastic member 140 while lowering, and the first elastic member 150 may be compressively and elastically deformed.

The first guide member 120 may have a groove 122 provided in a bottom surface thereof and configured to accommodate an upper end of the first elastic member 150, and the first guide member 120 may have a protrusion 123 provided on an upper surface thereof and inserted into a lower end of the second elastic member 140.

The second guide member 130 is disposed above the first guide member 120 and forms the second pressing chamber 13 between the first guide member 120 and the second guide member 130.

The second guide member 130 is provided with a second flow path 131 configured to allow the compression chamber 12 to communicate with the second pressing chamber 13.

In detail, the second flow path 131 may include a second main flow path 131a formed to vertically pass through a central portion of the second guide member 130 in a cylindrical shape, and a second slit flow path 131b formed to be recessed in a direction perpendicular to an axial direction in an upper surface of the second guide member 130 to communicate with the second main flow path 131a and formed to extend radially.

In this case, an inner diameter r1 of the second main flow path 131a is provided smaller than an outer diameter r3 of a bottom surface of the opening/closing member 32, and an inner diameter r2 of the second slit flow path 131b is provided greater than an outer diameter r3 of the bottom surface of the opening/closing member 32. Accordingly, the second guide member 130 may allow the compression chamber 12 to communicate with the second pressing chamber 13 through the second slit flow path 131b even when the opening/closing member 32 is lowered to come into close contact with the second guide member 130, and can prevent a negative pressure from being generated in the second pressing chamber 13 when the opening/closing member 32 returns.

The second guide member 130 may have a protrusion 132 provided on a bottom surface thereof and configured to accommodate an upper end of the second elastic member 140. For example, the protrusion 132 may be formed to protrude in a ring shape in a circumferential direction from the bottom surface of the second guide member 130 and may be inserted into the upper end of the second elastic member 140.

The second guide member 130 is spaced apart from the first guide member 120, and a lower end of the second guide member 130 is elastically supported by the second elastic member 140. During the compression stroke, the second guide member 130 may be lowered by pressing the opening/closing member 32 and may return to an original position thereof by an elastic force of the second elastic member 140. A detailed operation of the second guide member 130 will be described below.

The opening/closing member 32 may be provided in the compression chamber 12, spaced apart from the second guide member 130, and pressed by the piston rod 30.

The opening/closing member 32 is coupled to an end of the piston rod 30, is vertically movably provided together with the piston rod 30, and is provided to press the second guide member 130.

The opening/closing member 32 may include a body 32a, a flange 32b extending radially outward from the body 32a, and a hole 32c which is provided in the body 32a and into which the end of the piston rod 30 may be inserted.

The outer diameter r3 of the flange 32b of the opening/closing member 32 may be greater than the inner diameter r1 of the second main flow path 131a and smaller than the inner diameter r2 of the second slit flow path 131b. Accordingly, even when the opening/closing member 32 comes into close contact with the second guide member 130 when the opening/closing member 32 is lowered, the compression chamber 12 and the second pressing chamber 13 may communicate with each other through the second slit flow path 131b.

Hereinafter, an operation of the shock absorber 1 according to the embodiment of the present disclosure during the compression stroke will be described.

Figure 6:
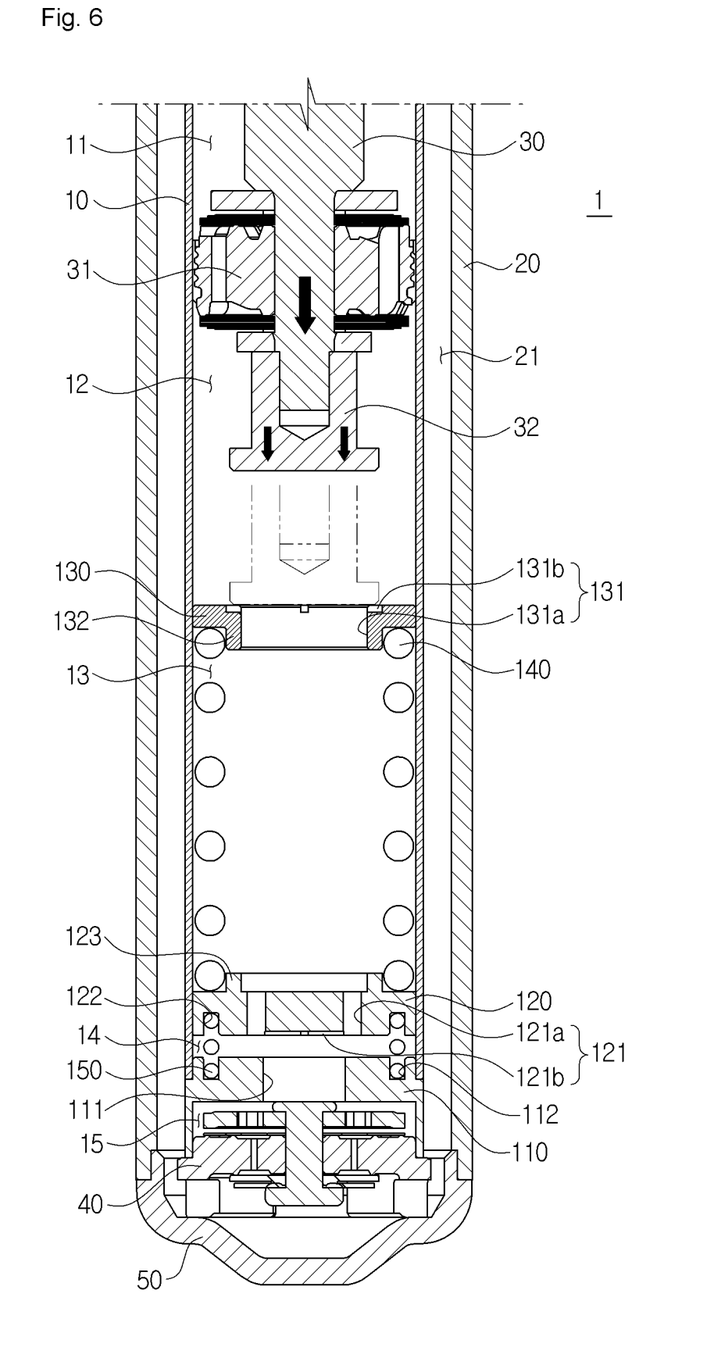
FIG. 6 is an operation diagram illustrating an operation of a valve assembly according to a stroke length of a piston rod during a compression stroke in a first section in the shock absorber according to the embodiment of the present disclosure.
Figure 7:
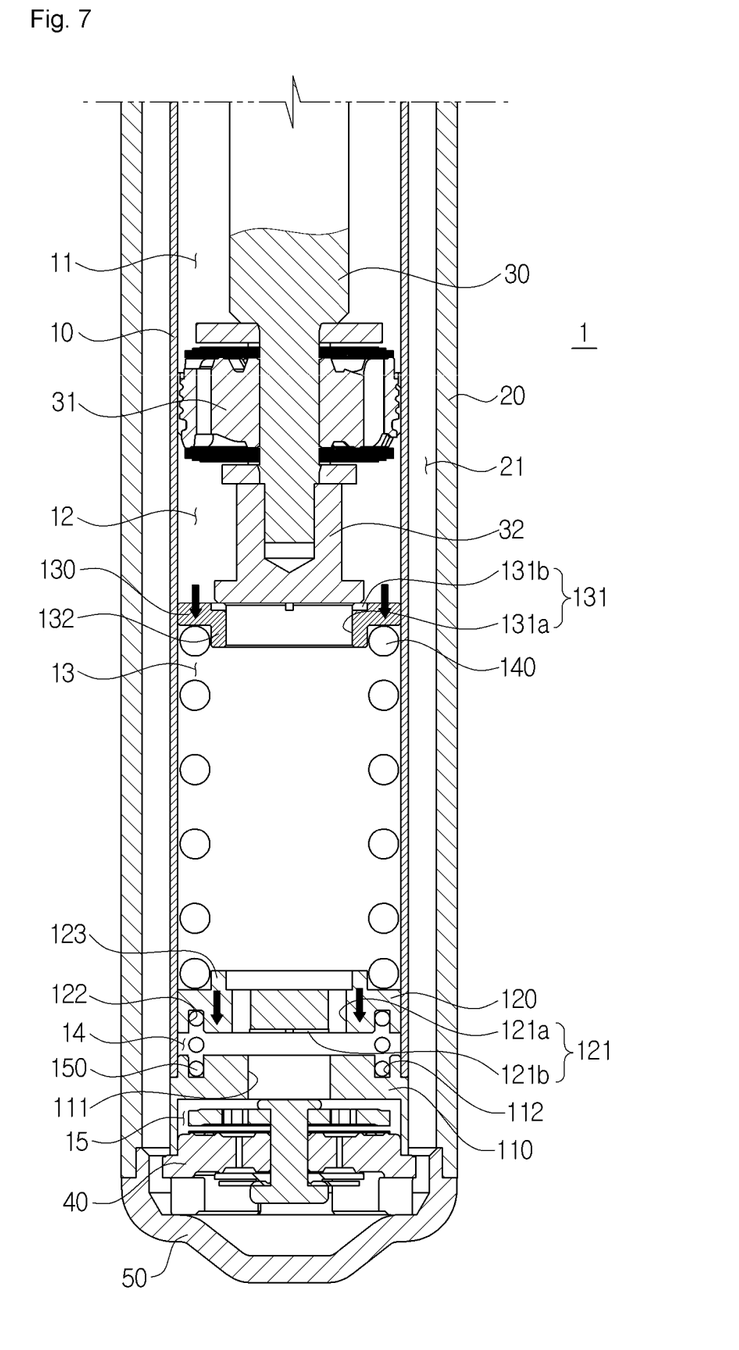
FIG. 7 is an operation diagram illustrating an operation of the valve assembly according to the stroke length of the piston rod during the compression stroke in a second section in the shock absorber according to the embodiment of the present disclosure.
Figure 8:
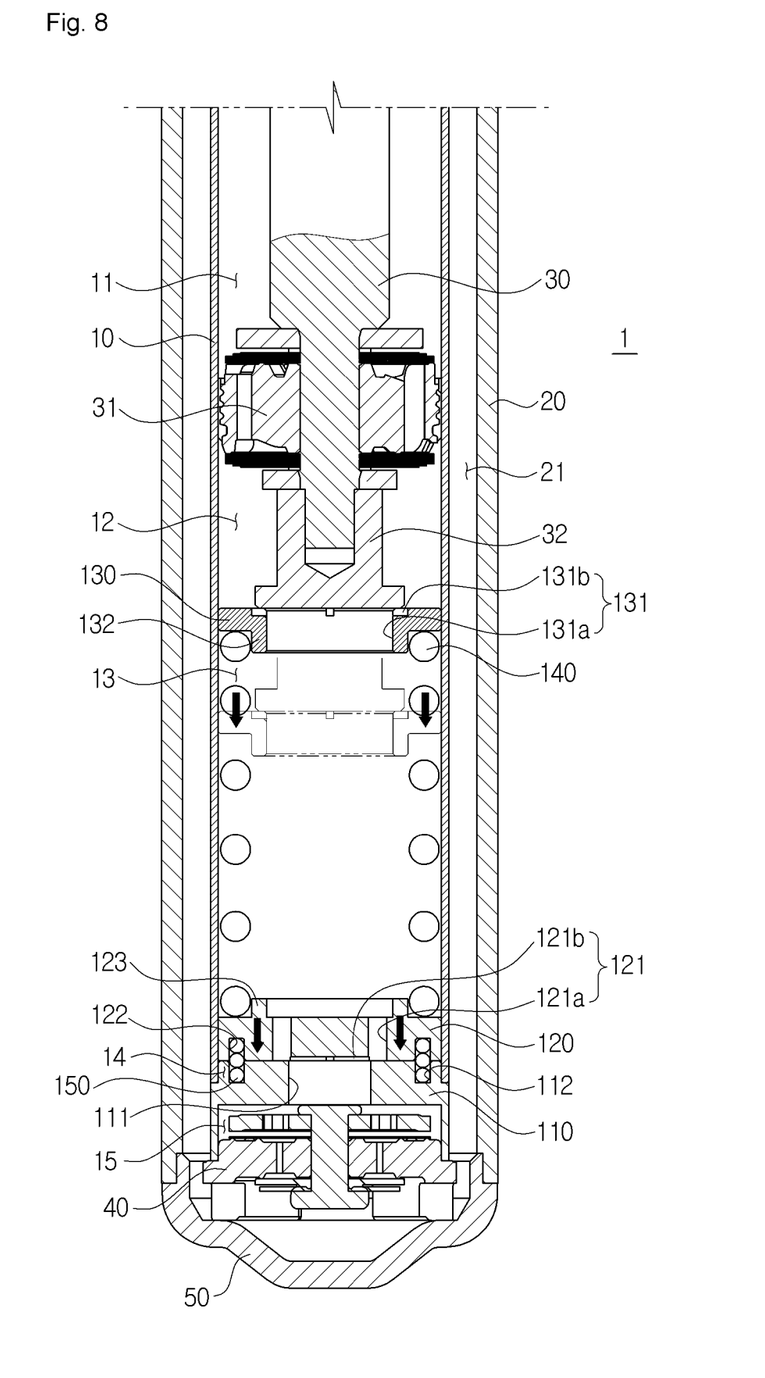
FIG. 8 is an operation diagram illustrating an operation of the valve assembly according to the stroke length of the piston rod during the compression stroke in a third section in the shock absorber according to the embodiment of the present disclosure.

FIGS. 6 to 8 are operation diagrams illustrating the operation of the valve assembly 100 according to the stroke length of the piston rod 30 during the compression stroke of the shock absorber 1 according to the embodiment of the present disclosure.

Referring to FIGS. 6 to 8, the shock absorber 1 according to the embodiment of the present disclosure generates different damping forces according to the stroke length or displacement of the piston rod 30 during the compression stroke.

The shock absorber 1 may be operated to increase a damping force according to the stroke length (the displacement) by which the piston rod 30 is lowered. In detail, as the piston rod 30 is lowered, the damping force is gradually increased in a first section that is a stroke section before the opening/closing member 32 reaches the second guide member 130, a second section that is a stroke section before the first guide member 120 reaches the support member 110 by lowering of the second guide member 130, and a third section that is a stroke section before the second guide member 130 reaches the first guide member 120.

Referring to FIG. 6, an operation of the shock absorber 1 in the first section that is a displacement section before the opening/closing member 32 reaches the second guide member 130 while the piston rod 30 is lowered inside the cylinder 10 during the compression stroke will be described.

In the first section, during the compression stroke, the shock absorber 1 generates a damping force due to resistance of the fluid accommodated in the compression chamber 12 as the fluid passes through the piston valve 31 and moves to the tension chamber 11. At the same time, the shock absorber 1 generates a damping force due to the resistance of the fluid accommodated in the compression chamber 12 as a portion of the fluid passes through the body valve 40 through the valve assembly 100, moves to the reservoir chamber 21, and is compressed.

In this case, since the connection flow path 111, the first flow path 121, and the second flow path 131 of the valve assembly 100 are in a fully opened state, almost no additional damping force is added.

That is, in the shock absorber 1, only a damping force caused by the piston valve 31 and the body valve 40 is applied, and almost no damping force caused by the valve assembly 100 is applied.

Referring to FIG. 7, the operation of the shock absorber 1 in the second section that is a stroke section before, during the compression stroke, the piston rod 30 is lowered inside the cylinder 10, the opening/closing member 32 presses the second guide member 130, and the first guide member 120 reaches the support member 110 by the lowering of the second guide member 130 will be described.

In the second section, during the compression stroke, since the elastic modulus of the second elastic member 140 is provided greater than the elastic modulus of the first elastic member 150, the shock absorber 1 is operated before, when the opening/closing member 32 presses the second guide member 130, the second elastic member 140 presses the first guide member 120, the first elastic member 150 is compressively elastically deformed, and the first guide member 120 is in close contact with the support member 110.

In this case, as the opening/closing member 32 presses the second guide member 130, the first and second pressing chambers 13 and 14 are in a high pressure state, and thus an additional damping force can be applied.

Referring to FIG. 8, an operation of the shock absorber 3 in the third section that is a stroke section before the second guide member 130 reaches the first guide member 120 while the piston rod 30 is lowered inside the cylinder 10 during the compression stroke will be described.

In the third section, the shock absorber 1 is operated so that the second guide member 130 is lowered while pressing the second elastic member 140 as the opening/closing member 32 presses the second guide member 130.

In this case, in the third section, since the first guide member 120 is in close contact with the support member 110, the area of a flow path of the fluid passing through the first guide member 120 is reduced, and thus an additional pressure is applied between the first guide member 120 and the support member 110.

In detail, as the first guide member 120 is in close contact with the support member 110, the first pressing chamber 14 is reduced, and thus the fluid passing through the first guide member 120 flows to the connection flow path 111 only through the first slit flow path 121b through the first main flow path 121a.

Accordingly, in the shock absorber 1, a damping force caused by a hydraulic pressure generated while the first guide member 120 and the support member 110 come into close contact with each other in the third section is additionally applied.

Thus, in the shock absorber 1 according to the embodiment of the present disclosure, during the compression stroke, an additional damping force is applied according to the stroke length of the piston rod 30, and thus a variable damping force can be applied.

Hereinafter, a shock absorber 2 according to a modified embodiment of the shock absorber 1 according to the embodiment of the present disclosure will be described.

In the description of the shock absorber 2 according to the modified embodiment of the present disclosure, the same content as the shock absorber 1 according to the embodiment of the present disclosure will be omitted to prevent duplication.

Figure 9:
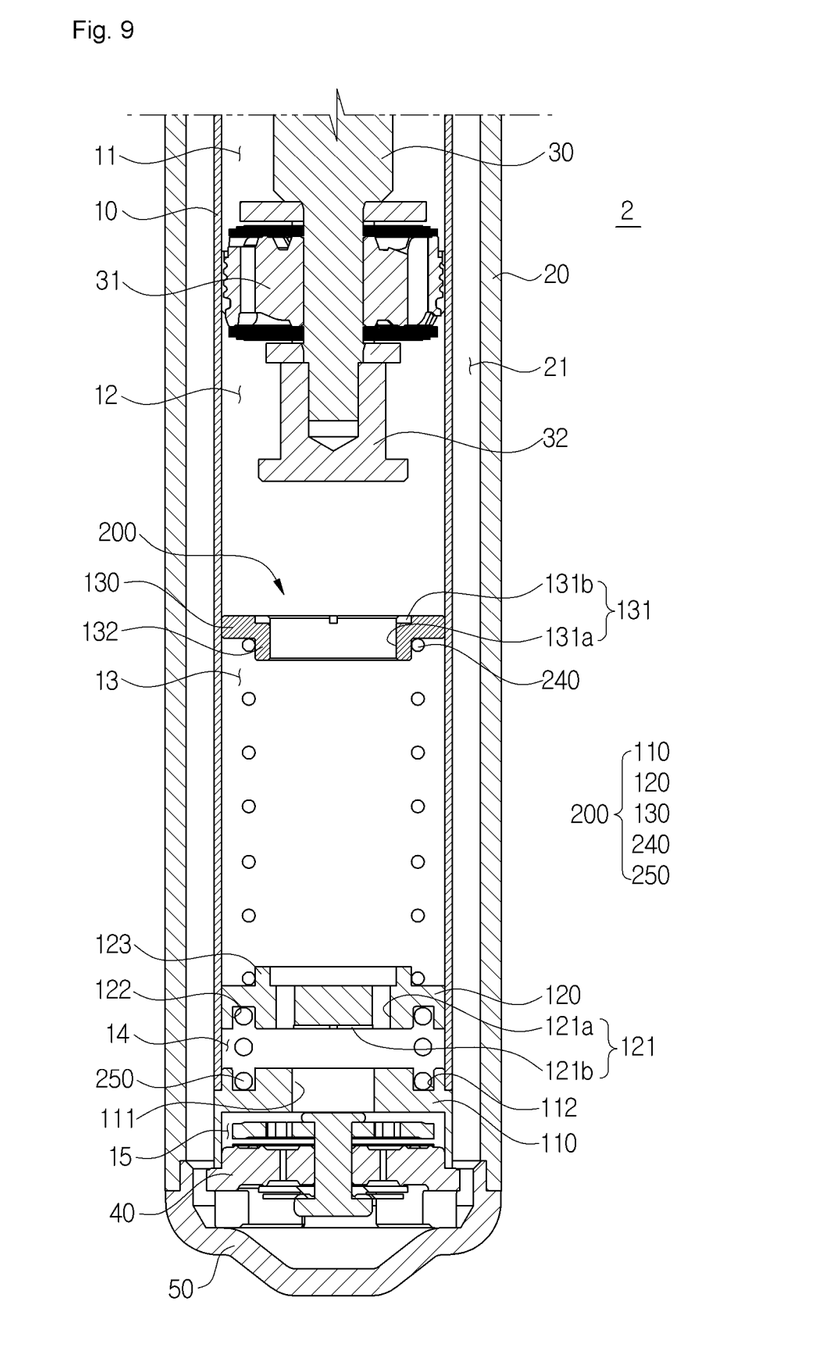
FIG. 9 is an enlarged cross-sectional view illustrating a shock absorber according to a modified embodiment of the present disclosure.

FIG. 9 is an enlarged cross-sectional view illustrating a shock absorber according to a modified embodiment of the present disclosure.

Referring to FIG. 9, a valve assembly 200 according to the modified embodiment of the present disclosure may include the support member 110 coupled to the end of the cylinder 10 and provided with the connection flow path 111, the first guide member 120 which forms the first pressing chamber 14 between the support member 110 and the first guide member 120 and through which the first flow path 121 is formed to pass, the second guide member 130 which forms the second pressing chamber 13 between the first guide member 120 and the second guide member 130 and has the second flow path 131 formed to allow the second pressing chamber 13 to communicate with the compression chamber 12, the opening/closing member 32 coupled to the end of the piston rod 30 and provided to press the second guide member 130 when the piston rod 30 is lowered, a first elastic member 250 provided between the first guide member 120 and the support member 110, and a second elastic member 240 provided between the first guide member 120 and the second guide member 130.

In the shock absorber 2 according to the modified embodiment of the present disclosure, the elastic modulus of the first elastic member 250 may be provided greater than the elastic modulus of the second elastic member 240.

Accordingly, when the opening/closing member 32 coupled to the end of the piston rod 30 presses the second guide member 130 during the compression stroke, as the second guide member 130 is pressed, the second elastic member 240 may be compressively and elastically deformed.

Accordingly, in the shock absorber 2 according to the modified embodiment of the present disclosure, compressive elastic deformation of the second elastic member 240 may be preemptively completed before the first guide member 120 is in close contact with the support member 110.

Figure 10:
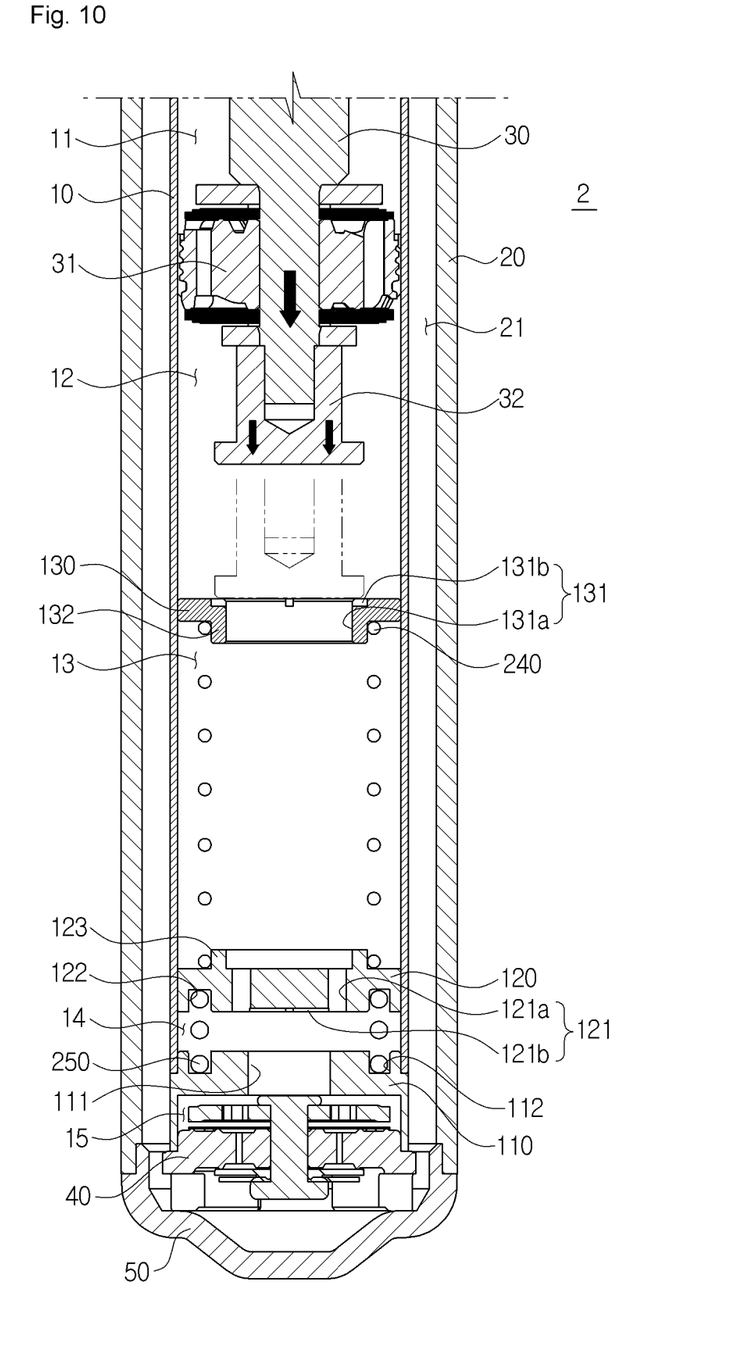
FIG. 10 is an operation diagram illustrating an operation of a valve assembly according to a stroke length of a piston rod during a compression stroke in a first section in the shock absorber according to the modified embodiment of the present disclosure.
Figure 11:
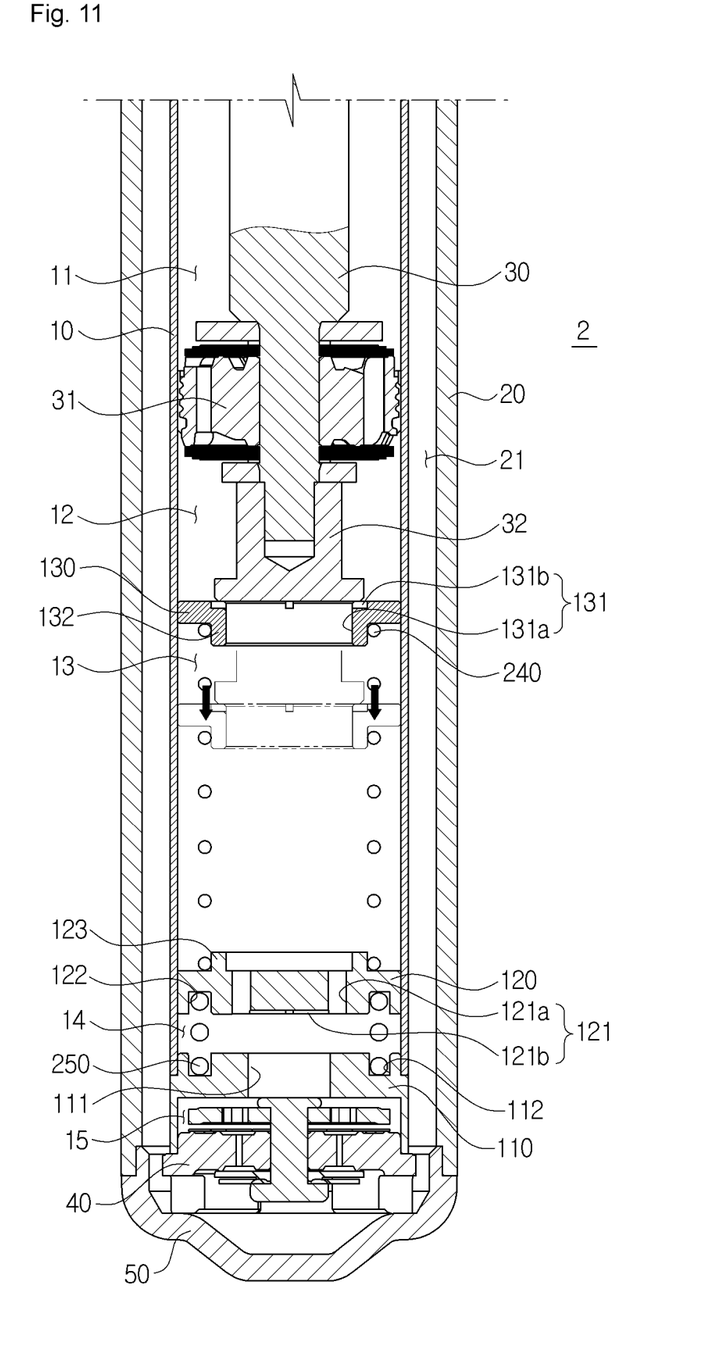
FIG. 11 is an operation diagram illustrating an operation of the valve assembly according to the stroke length of the piston rod during the compression stroke in a second section in the shock absorber according to the modified embodiment of the present disclosure.
Figure 12:
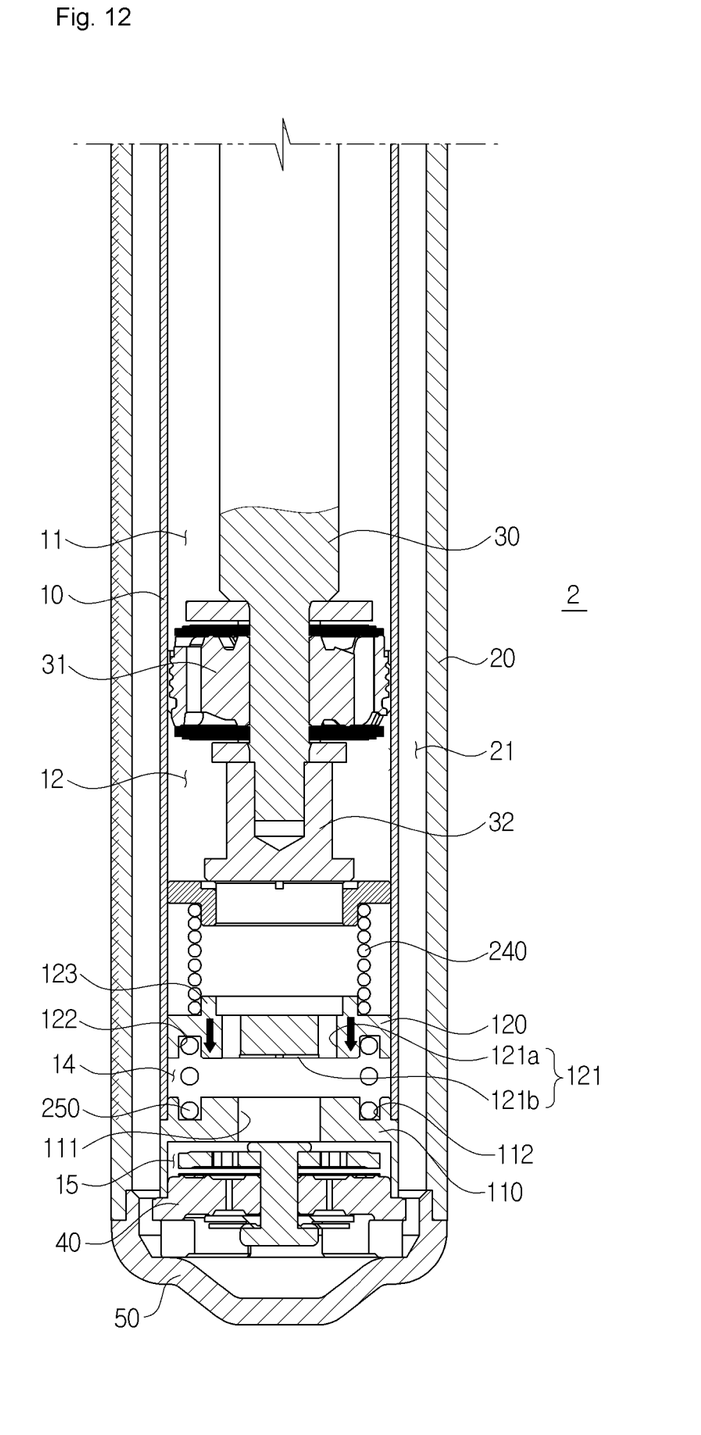
FIG. 12 is an operation diagram illustrating an operation of the valve assembly according to the stroke length of the piston rod during the compression stroke in a third section in the shock absorber according to the modified embodiment of the present disclosure.

FIGS. 10 to 12 are operation diagrams illustrating the operation of the valve assembly 200 according to the stroke length of the piston rod 30 during the compression stroke of the shock absorber 2 according to the modified embodiment of the present disclosure.

Referring to FIGS. 10 and 12, the shock absorber 2 according to the modified embodiment of the present disclosure generates different damping forces according to the stroke length or displacement of the piston rod 30 during the compression stroke.

The shock absorber 2 may be operated to increase a damping force according to the stroke length (the displacement) by which the piston rod 30 is lowered. In detail, as the piston rod 30 is lowered, the damping force is gradually increased in a first section that is a stroke section before the opening/closing member 32 reaches the second guide member 130, a second section that is a stroke section before the second guide member 130 is lowered to reach the first guide member 120, and a third section that is a stroke section before the first guide member 120 reaches the support member 110.

Referring to FIG. 10, an operation of the shock absorber 2 in the first section that is a displacement section before the opening/closing member 32 reaches the second guide member 130 while the piston rod 30 is lowered inside the cylinder 10 during the compression stroke will be described.

In the first section, during the compression stroke, the shock absorber 2 generates a damping force due to resistance of the fluid accommodated in the compression chamber 12 as the fluid passes through the piston valve 31 and moves to the tension chamber 11. At the same time, the shock absorber 2 generates a damping force due to the resistance of the fluid accommodated in the compression chamber 12 as a portion of the fluid passes through the body valve 40 through the valve assembly 200, moves to the reservoir chamber 21, and is compressed.

In this case, since the connection flow path 111, the first flow path 121, and the second flow path 131 of the valve assembly 200 are in a fully opened state, almost no additional damping force is added.

That is, in the shock absorber 2, only a damping force caused by the piston valve 31 and the body valve 40 is applied, and almost no damping force caused by the valve assembly 200 is applied.

Referring to FIG. 11, the operation of the shock absorber 2 in the second section that is a stroke section before, during the compression stroke, the piston rod 30 is lowered inside the cylinder 10, the opening/closing member 32 presses the second guide member 130, and the second guide member 130 is lowered to reach the first guide member 120 will be described.

In the second section, during the compression stroke, since the elastic modulus of the second elastic member 240 is provided smaller than the elastic modulus of the first elastic member 250, the shock absorber 2 is operated before, when the opening/closing member 32 presses the second guide member 130, the second elastic member 240 is compressed and elastically deformed, and the second guide member 130 is in close contact with the first guide member 120.

In this case, as the opening/closing member 32 presses the second guide member 130, the first and second pressing chambers 13 and 14 are in a high pressure state, and thus an additional damping force can be applied.

Referring to FIG. 12, an operation of the shock absorber 3 in the third section that is a stroke section before the first guide member 120 reaches the support member 110 while the piston rod 30 is lowered inside the cylinder 10 during the compression stroke will be described.

In the third section, the shock absorber 2 is operated so that the opening/closing member 32 presses the second guide member 130, the elastic deformation of the second elastic member 240 is completed, and thus the second elastic member 240 presses the first guide member 120 to move downward while compressing the first elastic member 250.

In this case, in the third section, the first and second pressing chambers 13 and 14 are in a high pressure state, and thus an additional damping force is added.

Thus, in the shock absorber 2 according to the modified embodiment of the present disclosure, during the compression stroke, an additional damping force is applied according to the stroke length of the piston rod 30, and thus a variable damping force can be applied.

As is apparent from the above description, a shock absorber according to an embodiment of the present disclosure prevents an excessive increase in the length and volume of a device by providing an additional damping force over a certain stroke during a compression stroke.

The shock absorber can improve ride comfort and adjustment stability of a vehicle by providing a step-by-step damping force over a certain stroke during the compression stroke.

As described below, although the present disclosure has been described with reference to limited embodiments and drawings, the present disclosure is not limited thereto. It is apparent that those skilled in the art to which the present disclosure belongs could derive various modifications and changes without departing from the technical spirit of the present disclosure and the equivalents of the appended claims.

What is claimed is:

1. A shock absorber including a cylinder filled with a fluid and a piston valve coupled to a piston rod and configured to partition an inside of the cylinder into a tension chamber and a compression chamber, the shock absorber comprising:
   a support member coupled to an end of the cylinder and provided with a connection flow path;
   a first guide member forming a first pressing chamber and provided with a first flow path formed to vertically pass therethrough;
   a second guide member forming a second pressing chamber and having a second flow path configured to allow the second pressing chamber to communicate with the compression chamber;
   an opening/closing member coupled to an end of the piston rod and provided to press the second guide member upon lowering the piston rod;
   a first elastic member provided between the first guide member and the support member; and
   a second elastic member provided between the first guide member and the second guide member,
   wherein an outer circumferential surface of the first guide member is in close contact with an inner circumferential surface of the cylinder,
   wherein the first flow path includes:
   a first main flow path provided in the form of a plurality of cylindrical holes and radially arranged on the first guide member; and
   a first slit flow path recessed in a bottom surface of the first guide member to communicate with the first main flow path and extending in the form of a slit toward a central portion of the first guide member,
   wherein the first slit flow path connects at least portions of the first main flow path to each other.

2. The shock absorber of claim 1, wherein the first pressing chamber is formed between the support member and the first guide member which are disposed to be spaced apart from each other.

3. The shock absorber of claim 2, wherein the second pressing chamber is formed between the first guide member and the second guide member which are disposed to be spaced apart from each other.

4. The shock absorber of claim 3, wherein an outer circumferential surface of the second guide member is in close contact with an inner circumferential surface of the cylinder, and the second flow path is provided at a central portion of the second guide member.

5. The shock absorber of claim 4, wherein the second flow path includes:
   a second main flow path formed to pass through the central portion of the second guide member in an axial direction; and
   a second slit flow path formed to be recessed in a top surface of the second guide member in a direction perpendicular to the axial direction.

6. The shock absorber of claim 5, wherein the opening/closing member includes a body, a flange formed to extend radially outward from a bottom surface of the body, and a hole which is provided in the body and into which the end of the piston rod is inserted.

7. The shock absorber of claim 6, wherein an outer diameter of the flange is provided greater than an inner diameter of the second main flow path and smaller than an inner diameter of the second slit flow path.

8. The shock absorber of claim 3, wherein one side of the first elastic member is inserted into a first groove provided in a bottom surface of the first guide member, and the other side thereof is inserted into a second groove provided in a top surface of the support member.

9. The shock absorber of claim 3, wherein one side of the second elastic member is coupled to a first protrusion provided on a top surface of the first guide member, and the other side thereof is coupled to a second protrusion provided on a bottom surface of the second guide member.

10. The shock absorber of claim 3, further comprising an outer tube disposed to be spaced apart from an outside of the cylinder and having a reservoir chamber formed between the cylinder and the outer tube.

11. The shock absorber of claim 10, further comprising a body valve coupled to a lower end of the support member, configured to allow the connection flow path to communicate with the reservoir chamber, and configured to generate a damping force.

12. The shock absorber of claim 3, wherein an elastic modulus of the first elastic member is provided greater than an elastic modulus of the second elastic member.

13. The shock absorber of claim 3, wherein an elastic modulus of the first elastic member is provided smaller than an elastic modulus of the second elastic member.

* * * * *